United States Patent [19]
Kim et al.

[11] Patent Number: 5,517,367
[45] Date of Patent: May 14, 1996

[54] REAR VIEW MIRROR FOR AUTOMOTIVE VEHICLE

[76] Inventors: Richard H. Kim, 10075 E. Warren Ave., Denver, Colo. 80231; Bobby Kim, 12331 E. Arkansas Ave., Aurora, Colo. 80012

[21] Appl. No.: 235,250

[22] Filed: Apr. 29, 1994

Related U.S. Application Data

[62] Division of Ser. No. 163,566, Dec. 8, 1993, abandoned.

[51] Int. Cl.$^6$ ............................ G02B 5/08; G02B 7/182; B60R 1/04
[52] U.S. Cl. .................. 359/864; 359/865; 359/872
[58] Field of Search ................. 359/863, 864, 359/865, 866, 868, 872, 850, 854, 855, 862

[56] References Cited

U.S. PATENT DOCUMENTS

| | | | |
|---|---|---|---|
| 2,214,639 | 9/1940 | Lenta | 359/854 |
| 2,605,676 | 8/1952 | Couch | 359/854 |
| 3,021,756 | 2/1962 | Milton et al. | 359/866 |
| 3,048,084 | 8/1962 | Iannuzzi | 359/865 |
| 3,146,296 | 8/1964 | Fischer | 359/864 |
| 3,389,952 | 6/1968 | Tobin, Jr. | 359/864 |
| 3,628,851 | 12/1971 | Robertson | 359/868 |
| 4,052,124 | 10/1977 | Marcus | 359/855 |
| 4,088,398 | 5/1978 | Zoursel . | |
| 4,258,979 | 3/1981 | Mahin | 359/868 |
| 4,264,144 | 4/1981 | McCord | 359/868 |
| 4,331,382 | 5/1982 | Graff | 359/868 |
| 4,345,819 | 8/1982 | Villa-Real | 359/865 |
| 4,486,075 | 12/1984 | Cohen | 359/865 |
| 4,575,202 | 3/1986 | McGuire | 359/864 |
| 4,674,850 | 6/1987 | Blom | 359/866 |
| 5,005,962 | 4/1991 | Edelman | 359/864 |
| 5,057,159 | 10/1991 | Weintraub . | |
| 5,061,003 | 10/1991 | Gabas . | |
| 5,061,004 | 10/1991 | Happich et al. . | |
| 5,115,352 | 5/1992 | Do Espirito Santo | 359/864 |
| 5,153,781 | 10/1992 | Brandt | 359/865 |
| 5,214,540 | 5/1993 | Yakimovsky . | |
| 5,295,021 | 3/1994 | Swanson | 359/865 |

FOREIGN PATENT DOCUMENTS

| | | | |
|---|---|---|---|
| 0157845 | 7/1954 | Australia | 359/865 |
| 0310261 | 4/1989 | European Pat. Off. | 359/865 |
| 2472493 | 7/1981 | France | 359/865 |
| 2588808 | 4/1987 | France | 359/868 |
| 1941895 | 3/1971 | Germany | 359/868 |
| 1947956 | 4/1971 | Germany | 359/868 |
| 1655862 | 7/1971 | Germany | 359/865 |
| 2725952 | 12/1978 | Germany | 359/868 |
| 3401033 | 7/1985 | Germany | 359/855 |
| 3502203 | 7/1986 | Germany | 359/855 |
| 3633693 | 4/1988 | Germany | 359/866 |
| 0110638 | 8/1980 | Japan | 359/866 |
| 2092534 | 8/1982 | United Kingdom | 359/868 |

*Primary Examiner*—Ricky D. Shafer
*Attorney, Agent, or Firm*—Gary M. Polumbus; Holland & Hart

[57] ABSTRACT

A rear view mirror for an automotive vehicle includes a universally mounted mirror system having a flat mirror component and a convex mirror component which are uniquely combined in several embodiments to enhance the rear view vision of an operator of the vehicle. In one embodiment, the convex mirror is pivotally positioned in overlying relationship with the flat mirror portion and adjustable laterally relative to the flat mirror portion. In another embodiment, the flat and convex mirror portions are contiguous in a horizontal direction while in a third embodiment the flat and convex mirror portions are horizontally aligned with the convex portion being universally mounted for adjustment relative to the flat mirrored portion.

1 Claim, 5 Drawing Sheets

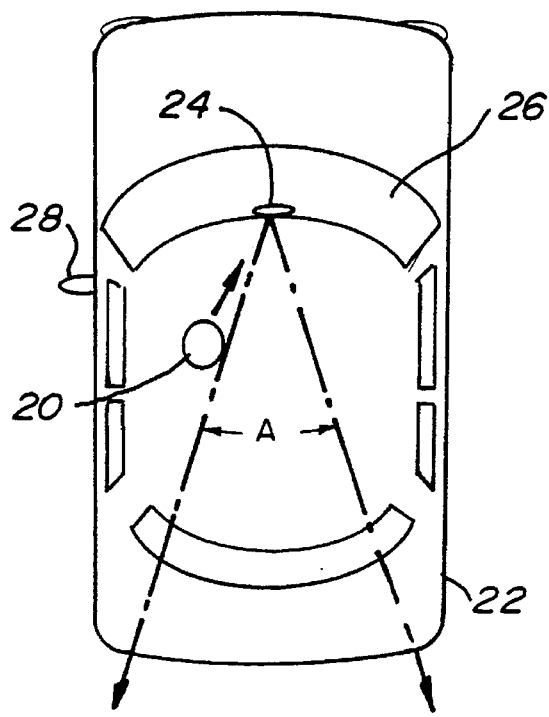
Fig._1
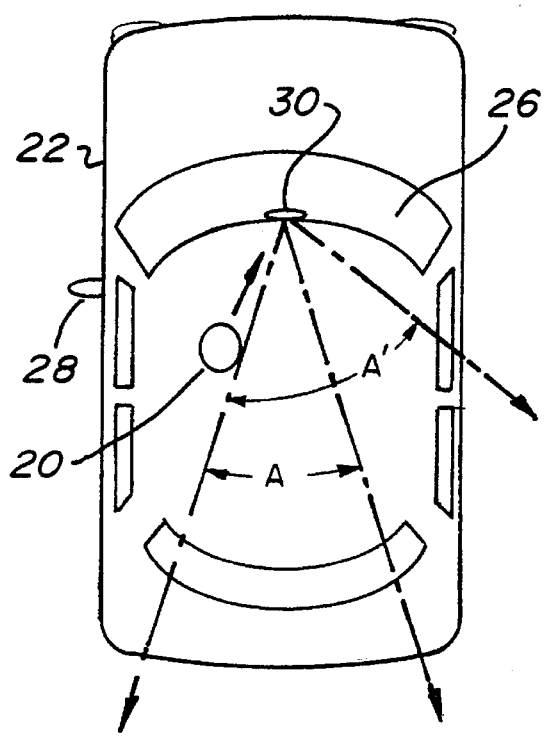
Fig._2
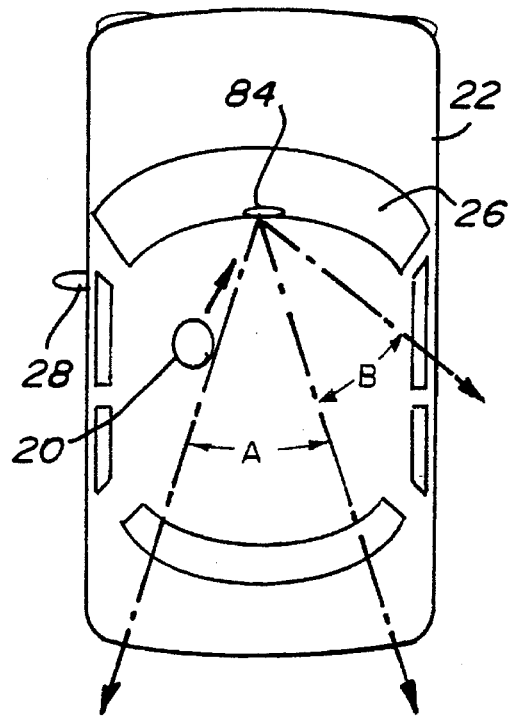
Fig._3
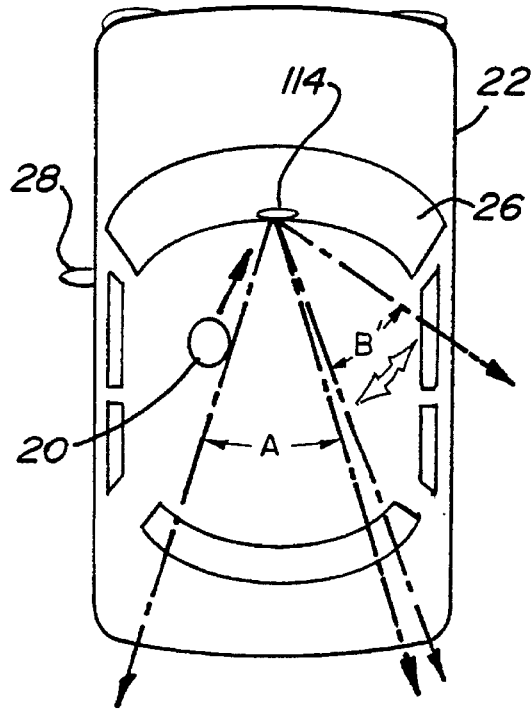
Fig._4

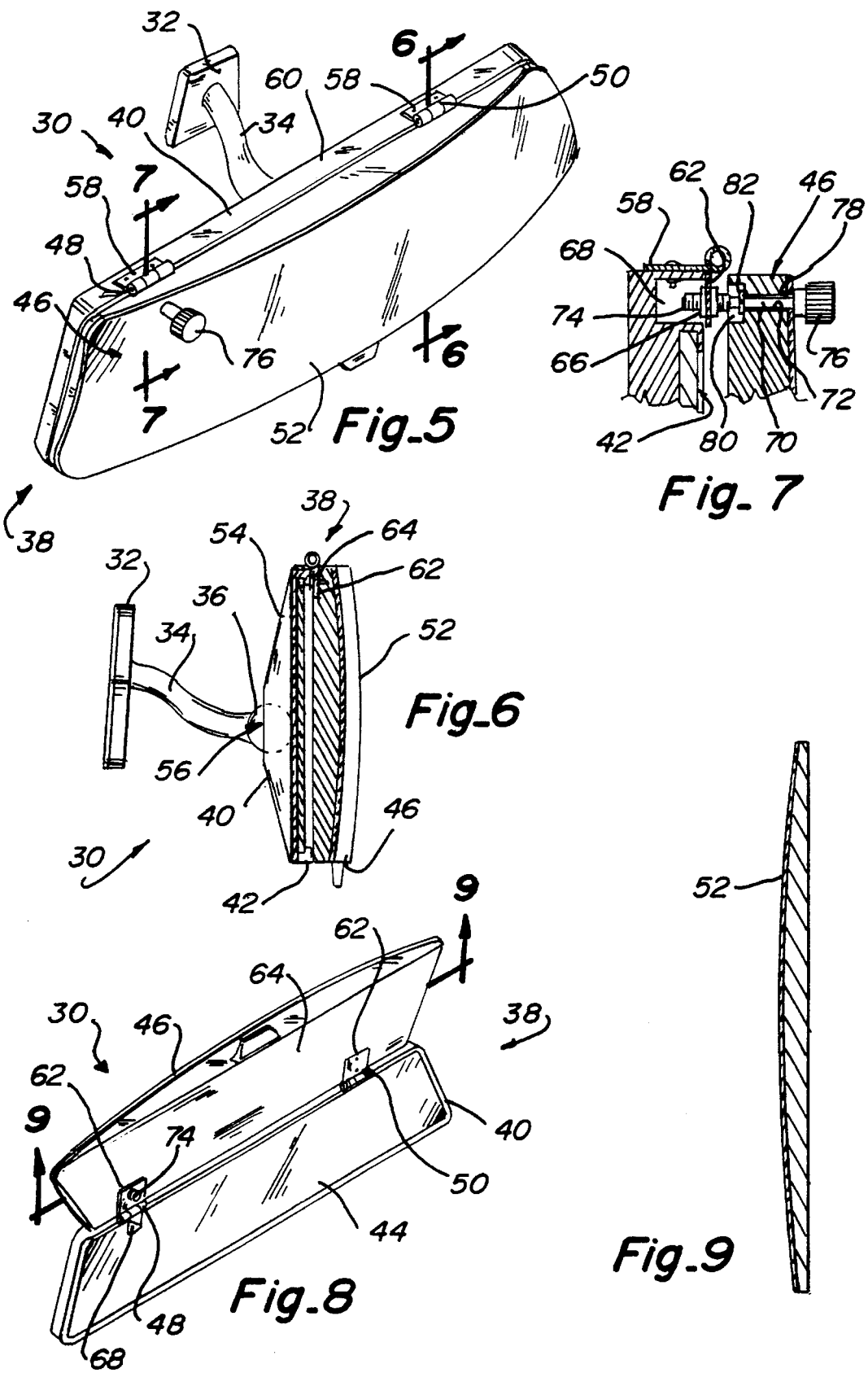

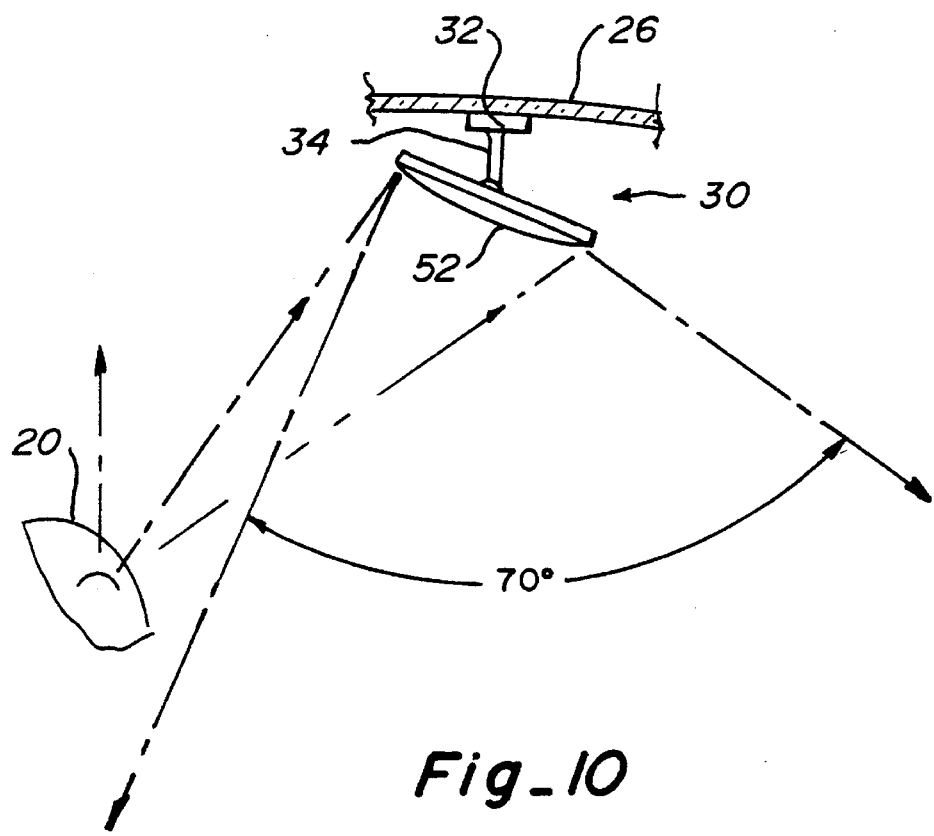
Fig_10
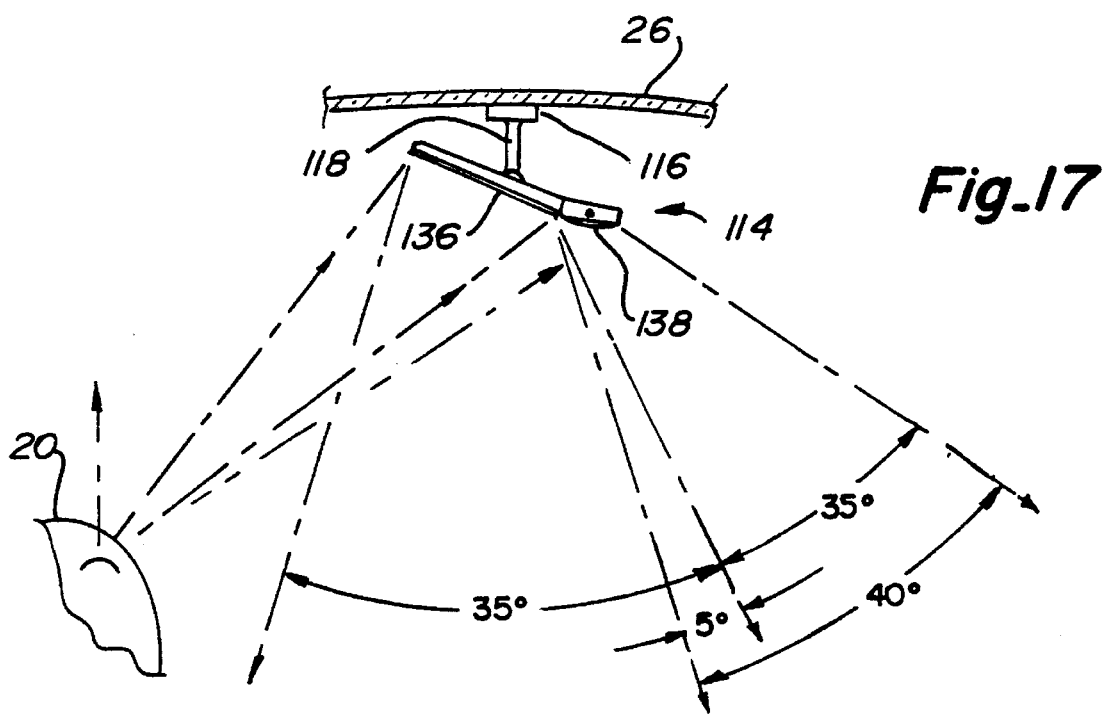
Fig_17

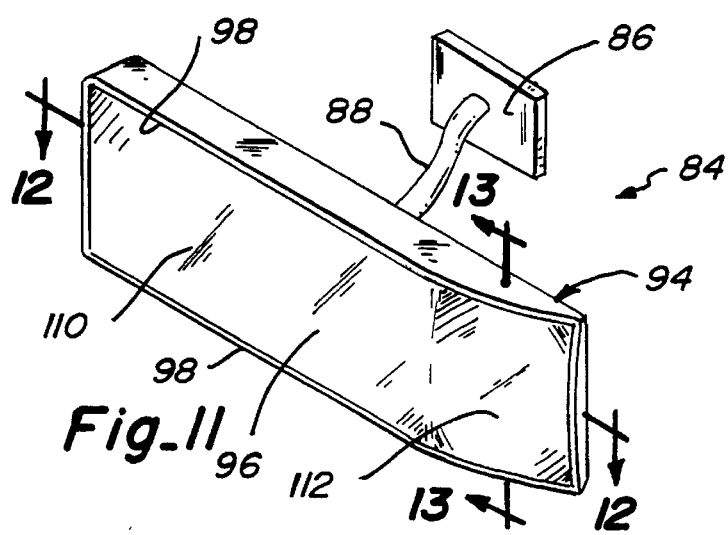
Fig._11
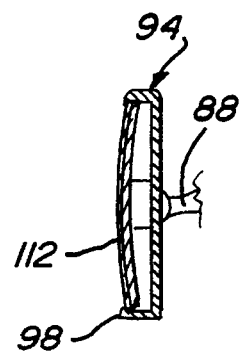
Fig._13
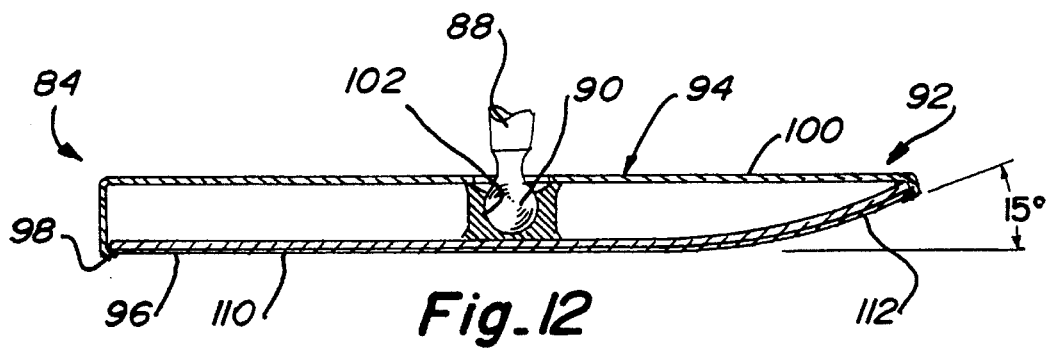
Fig._12
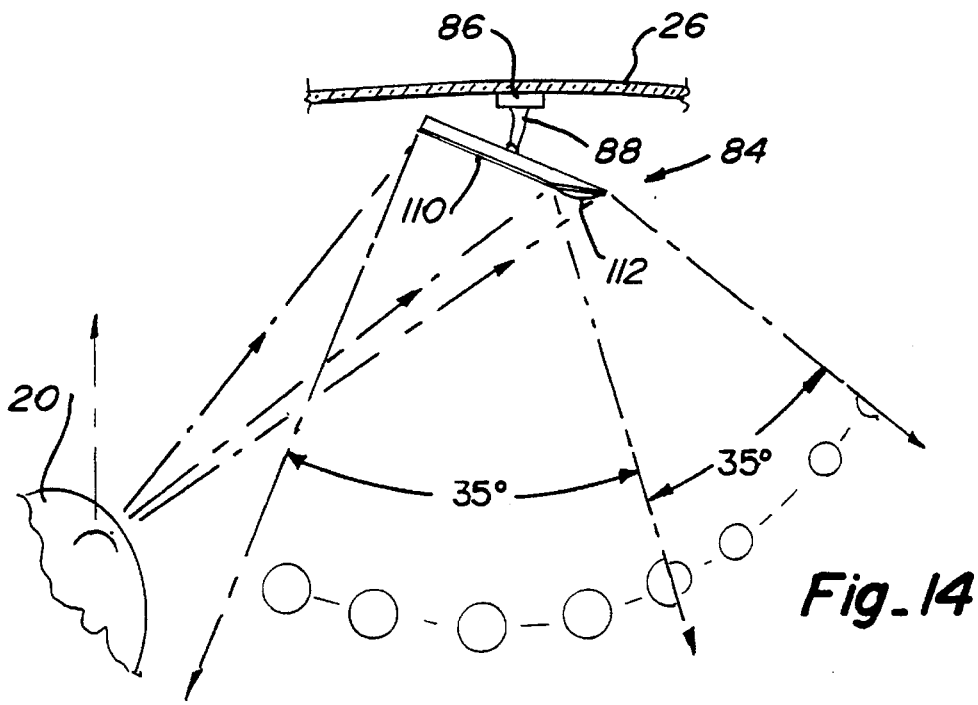
Fig._14

REAR VIEW MIRROR FOR AUTOMOTIVE VEHICLE

CROSS REFERENCE TO RELATED APPLICATION

This application is a division of application Ser. No. 08/163,566, filed Dec. 8, 1993, now abandoned.

BACKGROUND OF THE INVENTION

1. Field Of The Invention

The present invention relates generally to rear view mirrors for automotive vehicles and more particularly to an adjustable rear view mirror providing improved visibility through the use of flat and convex mirrored surfaces.

2. Description Of The Prior Art

Since the advent of the automotive vehicle, rear view mirrors for use in the vehicle have been of primary importance as the vehicles moved much more quickly and responsively than prior horse-drawn carriages. It has become increasingly important due to increased traffic and vehicle speeds to have an optimum view of what is behind and to the sides of a vehicle in addition to what is readily viewable in front of the vehicle.

While many cars are intentionally designed to provide good peripheral and rear vision by optimizing window space around the perimeter of the cab of a vehicle, aesthetic design considerations often override utilitarian considerations thereby leaving some vehicles less than desirable from a vision standpoint.

Further, conventional rear view mirrors typically have a flat mirrored surface providing a fixed range of vision for an operator of the vehicle even though the positioning of that range is adjustable through a universal mounting of the mirror on the windshield of the vehicle. When the mirror is set in a predetermined position, however, the angle of vision is no greater than a predetermined angle as determined primarily by the horizontal width of the mirror.

Attempts have been made to broaden the angle of rear vision provided to the operator of an automotive vehicle. Some such attempts have included a plurality of laterally spaced flat mirrored surfaces which form an angle relative to each other and thus various angles relative to the operator of the vehicle so that a broader spectrum of rear vision is provided. Other attempts have been in the form of attachments to mirrors which have been devised such that a convex mirror may be removably attached to a conventional flat automotive mirror with the curvature of the convex mirror being such that the angle of rear viewing is greater than that provided by the flat mirror of the same size. Further, convex mirrors have been provided for adhesive attachment over conventional flat mirrors again to broaden the range of vision. In these instances, however, the driver is usually predominantly limited to use of the convex mirror as opposed to the flat mirror as the convex mirror overlies a significant portion of the flat mirror and as will be appreciated, convex mirrors do in fact distort vision to some degree leaving the operator of the vehicle with a predominantly distorted rear view.

It is against this background of prior art that the present invention has been developed.

SUMMARY OF THE INVENTION

The rear view automotive mirror of the present invention has been uniquely designed in several embodiments to incorporate a pair of mirrored surfaces with one of the surfaces being flat and the other convex. The mirrored surfaces are interconnected such that the operator of an automotive vehicle can selectively use either or both of the mirrored surfaces for obtaining optimal rear vision.

In one embodiment of the invention, a convex mirror is hingedly connected to a flat mirror so that the surfaces can be individually selected for viewing separately and independently. In another embodiment, a flat horizontally elongated mirror has a horizontal extension with a convex surface so that the flat mirror can be used for vision directly behind the vehicle while the convex mirror provides an enlarged view to the right side of the vehicle. In still another embodiment of the invention, a convex mirror is adjustably mounted adjacent to the right side of an elongated flat mirror so that the flat mirror can again be used to view an area behind the vehicle and the adjustable convex mirror used to adjustably and selectively view an enlarged area to the side and rearwardly of the vehicle.

The rear view mirror of the present invention thereby permits the operator of a vehicle to have enhanced rear view vision while operating the vehicle and provides the enhancement in a way that is selectively adjustable.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a diagrammatic plan view of an automotive vehicle having a conventional flat rear view mirror.

FIG. 2 is a diagrammatic plan view similar to FIG. 1 illustrating the vision available with a first embodiment of the present invention as shown in FIGS. 5–10.

FIG. 3 is a diagrammatic plan view similar to FIG. 1 illustrating the vision obtainable from a second embodiment of the present invention as seen in FIGS. 11–14.

FIG. 4 is a diagrammatic plan view similar to FIG. 1 illustrating the vision available with a third embodiment of the present invention as illustrated in FIGS. 15–17.

FIG. 5 is an isometric view of a first embodiment of the rear view mirror of the present invention.

FIG. 6 is an enlarged section taken along line 6—6 of FIG. 5.

FIG. 7 is an enlarged section taken along line 7—7 of FIG. 5.

FIG. 8 is an isometric view of the mirror shown in FIG. 5 with the mirror moved into an alternate position.

FIG. 9 is an enlarged section taken along line 9—9 of FIG. 8.

FIG. 10 is a diagrammatic illustration showing the range of view available with the mirror of FIG. 5 in the position illustrated in FIG. 5.

FIG. 11 is an isometric view of a second embodiment of the rear view mirror of the present invention.

FIG. 12 is an enlarged fragmentary section taken along line 12—12 of FIG. 11.

FIG. 13 is a fragmentary section taken along line 13—13 of FIG. 11.

FIG. 14 is a diagrammatic top plan view illustrating the field of vision available with the embodiment of the invention shown in FIG. 11.

FIG. 17 is a diagrammatic top plan view of an automotive vehicle illustrating the field of vision available with the embodiment of the invention shown in FIG. 15.

DESCRIPTION OF THE PREFERRED EMBODIMENTS

Figure 15:
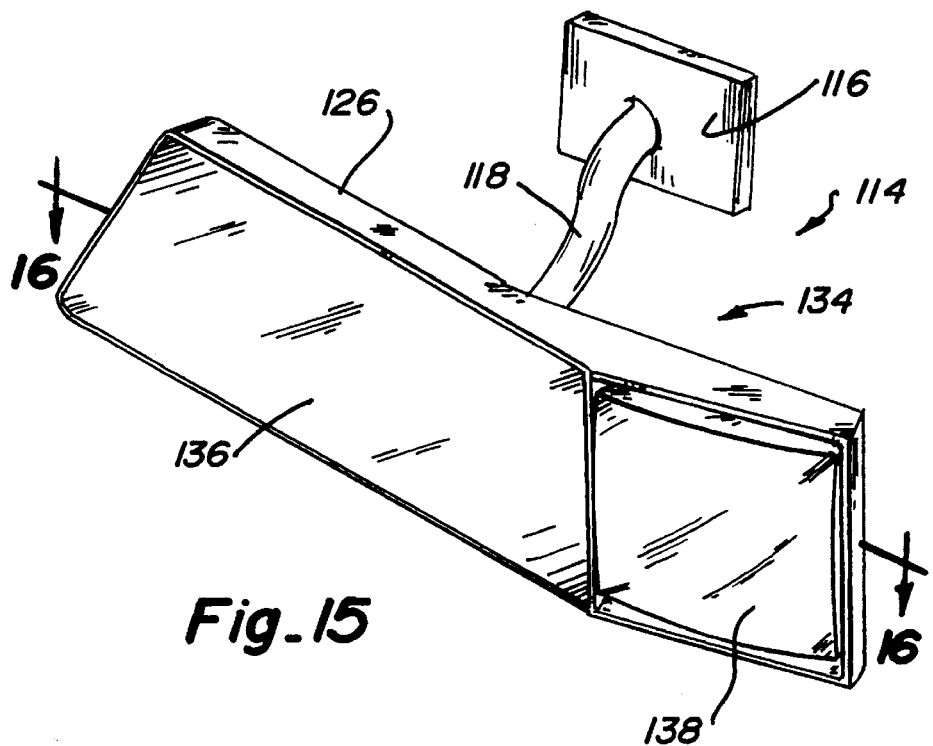
FIG. 15 is an isometric view of a third embodiment of the rear view mirror of the present invention.

FIG. 1 illustrates the angle A of rear vision available to the operator 20 of an automotive vehicle 22 utilizing a conventional standard flat rear view mirror 24 mounted interiorly on the windshield 26 of the vehicle. As will be appreciated, a considerable area to the sides of the vehicle are not in view of the operator without taking his eyes off the road in front of the vehicle which is a particularly acute problem on the right side of the vehicle more than the left due to the fact that typically the vehicle will have an outside rear view mirror 28 on the left side of the vehicle.

A first embodiment 30 of the rear view mirror of the present invention is shown in FIG. 5 to include a mounting base 32 that typically has an adhesive on a front face thereof so that the mounting base can be securely adhered to the windshield 26 or other such mounting surface within the automotive vehicle 22. Reference herein to front and rear is to be interpreted with reference to the front end and rear end of the vehicle 22 on which the mirror is mounted. A rearwardly projecting mounting arm 34 is rigidly secured or mounted on the mounting base 32. The mounting arm is slightly arcuate in configuration and angles slightly downwardly in a rearward direction. The distal or rearwardmost end of the arm has a substantially spherical head 36 forming a male connection element of a universal connector interconnecting the mounting arm 34 with a mirror system 38.

The mirror system 38 includes a backing plate 40 of substantially rectangular configuration having a recessed rear face in which is disposed a conventional mirror 42 having a flat mirrored surface 44. A pivotal plate 46 is hingedly connected to the backing plate 40 along upper horizontal edges of each plate by conventional hinges 48 and 50 so that the pivotal plate 46 can be selectively moved about the horizontal top edge of the backing plate. The pivotal plate has a convex mirrored surface 52 which is curved in both horizontal and vertical directions as best illustrated in FIG. 9. The convex mirrored surface faces rearwardly when the backing plate 40 and pivotal plate 46 are in confronting overlapped relationship as seen in FIG. 5.

The front face 54 of the backing plate has a socket 56 formed at its geometric center with the socket defining the female element of the universal connector. The socket 56 is configured between a hemispherical shape and a spherical shape and made of a somewhat resilient material so that the spherical head 36 on the mounting arm 34 can be snapped into the socket to retain the mirror system in a universally pivotal relationship relative to the mounting arm. Such mounting systems are well-known in the art and a more detailed description thereof is not felt necessary.

As can be appreciated, both the convex and flat mirrored surfaces 52 and 44 respectively of the mirror system 38 are horizontally elongated and of generally rectangular configuration. The hinges 48 and 50 interconnecting the backing plate 40 with the pivotal plate 46 have one leg 58 attached to a top surface 60 of the backing plate at horizontally spaced locations. The hinge 50 disposed on the right side of the mirror system as viewed in FIG. 5 has a second leg 62 attached to a front surface 64 of the pivotal plate 46 in a loose manner for a reason to be described hereafter. A second leg 62 of the hinge 48 on the left side of the mirror system as viewed in FIG. 5 hangs downwardly between the backing plate and the pivotal plate and has secured thereto a threaded nut 66 aligned with a cavity 68 formed in the backing plate.

An adjustment screw or pin 70 extends through an aperture 72 in the pivotal plate 46 and has a threaded forward-most end 74 and a thumb screw head 76 on the rearward most end. The threaded end 74 is received in a threaded opening through the nut 66 while a shoulder 78 adjacent to the thumb screw head abuts the convex mirrored surface 52 of the pivotal plate. A recess or pocket 80 is formed in the front surface 64 of the pivotal plate in alignment with the aperture 72 through the pivotal plate and a snap ring 82 is fixedly positioned on the pin 70 within the recess 80. It will therefore be appreciated that rotative movement of the adjustment pin 70 will selectively move the left end of the pivotal plate 46 relative to the flat mirrored surface 44 of the backing plate so that the spacing between the pivotal plate and the backing plate at the left side of the mirror can be regulated to adjust the angle of vision of the operator of the vehicle when looking at the convex mirrored surface. The loose connection of the right hinge 50 to the pivotal plate allows for the small amount of pivotal movement created by axial adjustment of the adjustment pin.

As will be appreciated from the above description and from FIGS. 5 and 8, the first embodiment of the rear view mirror is moveable between two positions with one position illustrated in FIG. 5 that allows the operator of the vehicle to utilize the convex mirror 52 to obtain a broader rear angle view. Pivotal movement of the pivotal plate upwardly about the hinges exposes the flat mirrored surface 44 of the backing plate as shown in FIG. 8 which allows the operator of the vehicle to obtain a rear angle view similar to that found with conventional automotive rear view mirrors. As mentioned previously, when the mirror is in the position illustrated in FIG. 5, the mirror can be pivoted in a horizontal plane about the right hinge 50 through rotative movement of the adjustment pin to select a desired position for optimal rear vision.

FIG. 10 diagrammatically shows by way of illustration the first embodiment 30 of the mirror wherein the convex mirror 52 provides a rear angle of vision of seventy degrees. This is substantially greater than the angle of vision obtainable from the flat mirror 44 which might be by way of example thirty-five degrees. FIG. 2 also diagrammatically illustrates the angles of vision available with the embodiment of FIGS. 5 through 10, and it can be seen that when using the flat mirror 44 on the backing plate, the operator has the same angle of vision represented by the letter A as found with a conventional mirror 24 (as shown in FIG. 1) while use of the convex mirror 52 when folded down into an overlapping relationship with the flat mirrored surface permits vision through angle A'. In other words, with the convex mirror, the operator of the vehicle obtains a better view of the right side of the vehicle when looking rearwardly through the mirror.

A second embodiment 84 of the present invention is illustrated in FIGS. 11 through 14 wherein it will be appreciated that a mounting plate 86 having an adhesive front face for adhering the mirror to the windshield 26 of an automotive vehicle 22 or the like is provided and includes a rearwardly and downwardly projecting curved mounting arm 88 having a substantially spherical head 90 on its free end. A mirror system 92 is universally mounted on the spherical head 90 and includes a backing plate 94 with a mirrored surface 96 along a rear edge 98. The front wall 100 of the backing plate has a socket 102 formed therein which is between hemispherical and spherical in configuration and made of a somewhat resilient material so that the spherical head 90 on the mounting arm can be snapped into the socket to retain the mirror system 92 on the mounting arm in a universally pivotal manner.

As best viewed in FIG. 11, the backing plate 94 is horizontally elongated and of generally rectangular configuration. The rear edge 98 of the backing plate at its right end tapers forwardly and to the right as viewed in FIG. 11. The mirrored surface 96 is flat across an area 110 covering approximately three-fourths of the mirror commencing from the left edge of the mirror with the right hand quarter 112 of the mirror being convex. The convex portion 112 of the mirror is curved in both a horizontal and vertical plane as seen in FIGS. 12 and 13 to broaden the range of vision which would be available with a flat mirror. Of course, the mirror is adjustable relative to the operator of the vehicle and by reference to FIG. 14, the various angles of vision available with the mirror are diagrammatically illustrated.

As will be appreciated by reference to FIG. 14, the operator of the vehicle by way of example can look into the flat portion 110 of the mirrored surface and obtain an angle of vision, for example thirty-five degrees, and by viewing the convex right hand quarter 112 of the mirrored surface can obtain another approximately thirty-five degrees of vision to the right side of the vehicle. This is further illustrated diagrammatically in FIG. 3 wherein angle A shows the vision obtainable through the flat portion 110 of the mirrored surface while angle B illustrates the vision through the convex portion 112 of the mirrored surface.

Figure 16:
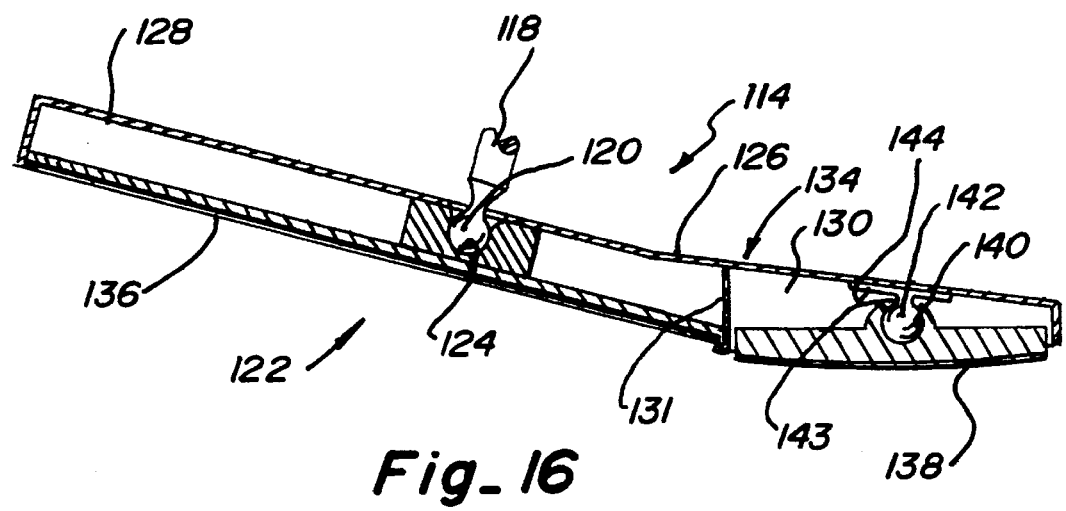
FIG. 16 is a fragmentary section taken along line 16—16 of FIG. 15.

A third embodiment 114 of the present invention in shown in FIGS. 15 through 17 and it will be therein appreciated that again the mirror has a mounting base 116 of generally rectangular configuration having a front face with an adhesive surface for bonding the mirror to a windshield of an automotive vehicle. A rearwardly and downwardly curved mounting arm 118 is formed on the mounting plate and has a substantially spherical head 120 on its rearwardmost or distal end. A mirror system 122 is universally connected to the mounting arm through the use of a socket 124 formed in a backing plate 126 of the mirror system with the socket having a configuration between a hemisphere and sphere and made of a somewhat resilient material so that the spherical head 120 on the mounting arm can be snapped into the socket 124 to universally mount the mirror system on the arm.

The backing plate 126 is of substantially rectangular configuration defining a first rearwardly opening recess 128 on the left hand side of the mirror system extending approximately three quarters of the horizontal length of the mirror system and a second rearwardly opening recess 130 on the right hand quarter of the backing plate. The left and right side recesses are divided by an internal divider 131 projecting rearwardly from the backing plate. A right side portion 134 of the backing plate is flared slightly forwardly and to the right. A mirror 136 having a flat mirrored surface is fixidly mounted in the first recess 128 of the backing plate for unitary movement therewith adjacent to the rearwardmost edge thereof and a second mirror 138 having a convex mirrored surface is mounted in the second recess 130. The second mirror has a pocket 140 formed in its front face of a configuration between a hemisphere and a sphere and is made of a somewhat resilient material so as to universally receive and retain a substantially spherical head 142 mounted on a secondary mounting arm 143 projecting rearwardly from the backing plate. The secondary mounting arm 143 is supported by a support plate 144 securely attached to the rear face of the backing plate and disposed within the second recess.

It will be appreciated that the second mirror 138 is universally pivotal and further has a convex surface to broaden the range of vision available to the operator of the vehicle through a lateral extension of the operator's view to the right of the vehicle. The rear view available to the operator of the vehicle is probably best illustrated in FIGS. 4 and 17. With reference first to FIG. 4, it will be appreciated that the angle of view from the flat mirror 136 is represented by the letter A with the angle of view available from the convex mirror 138 being represented by an angle B' which is adjustable, not in width, but in position so that it can be made to abut angle A or overlap angle A.

By way of illustrative example, FIG. 17 shows the angle of vision from the flat mirror 136 as being thirty-five degrees while the angle of vision from the smaller convex mirror 138 is also thirty-five degrees but movable within a five degree arc so as to be either contiguous with the range of vision from the flat portion of the mirror or overlapping slightly.

It will be appreciated from the above description that the mirror of the present invention provides a distinct advantage over conventional car mirrors of either the flat or convex configuration by combining into one mirror selectively adjustable viewing capabilities to enhance and increase vision to the rear and to the right of the vehicle.

Although the present invention has been described with a certain degree of particularity, it is understood that the present disclosure has been made by way of example, and changes in detail or structure may be made without departing from the spirit of the invention, as defined in the appended claims.

I claim:

1. An interior rear view mirror for an automotive vehicle having a front end and a rear end, comprising:

a mounting base adapted to be secured to the vehicle;

a mounting arm extending rearwardly from the mounting base and terminating in a substantially spherical head;

a mirror housing having a backing plate with a left hand side portion and a right hand side portion, said right hand side portion of the backing plate extending forwardly towards said mounting base at a predetermined angle relative to the left hand side portion to increase the view angle to the right side of the vehicle;

said mirror housing including an internal divider extending rearwardly from said backing plate to define a first recess to the rear of the left hand side portion of the backing plate and a second recess to the rear of the right hand side portion of the backing plate;

a socket fixed to the mirror housing within the first recess to receive the spherical head of the mounting arm and adjustably mount the mirror housing to the mounting arm;

a substantially flat mirror component fixedly connected to said internal divider within the first recess for unitary movement with the mirror housing;

a secondary mounting arm attached to the backing plate within the second recess, said secondary mounting arm having a spherical head extending rearwardly from the rear of the backing plate; and a convex mirror having a socket to receive the spherical head of the secondary mounting arm and adjustably mount the convex mirror within the second recess for independent movement of the convex mirror relative to the mirror housing.

* * * * *